US012373587B2

(12) United States Patent
Adeel et al.

(10) Patent No.: US 12,373,587 B2
(45) Date of Patent: Jul. 29, 2025

(54) MAINTAINING DATA SECURITY IN A MULTI-TENANT MICROSERVICE ENVIRONMENT

(71) Applicants: Getac Technology Corporation, Taipei (TW); WHP Workflow Solutions, Inc., North Charleston, SC (US)

(72) Inventors: Muhammad Adeel, Edina, MN (US); Thomas Guzik, Edina, MN (US)

(73) Assignees: Getac Technology Corporation, Taipei (TW); WHP Workflow Solutions, Inc., North Charleston, SC (US)

( * ) Notice: Subject to any disclaimer, the term of this patent is extended or adjusted under 35 U.S.C. 154(b) by 457 days.

(21) Appl. No.: 17/881,073

(22) Filed: Aug. 4, 2022

(65) Prior Publication Data
US 2024/0045980 A1 Feb. 8, 2024

(51) Int. Cl.
G06F 15/16 (2006.01)
G06F 9/54 (2006.01)
G06F 16/22 (2019.01)
G06F 21/62 (2013.01)
H04L 29/06 (2006.01)

(52) U.S. Cl.
CPC ...... *G06F 21/6218* (2013.01); *G06F 16/2219* (2019.01)

(58) Field of Classification Search
CPC . G06F 21/6218; G06F 16/2219; G06F 16/248
USPC .......................................................... 726/28
See application file for complete search history.

(56) References Cited

U.S. PATENT DOCUMENTS

| 9,043,196 | B1 | 5/2015 | Leydon et al. |
| 9,508,048 | B2* | 11/2016 | Said .................... G06F 16/2264 |
| 11,032,164 | B1 | 6/2021 | Rothschild et al. |
| 11,457,080 | B1 | 9/2022 | Meduri et al. |
| 11,563,636 | B1 | 1/2023 | Kairali et al. |
| 2012/0173589 | A1* | 7/2012 | Kwon .................... G06F 16/211 |
| | | | 707/E17.005 |

(Continued)

FOREIGN PATENT DOCUMENTS

| KR | 20180028520 A | 3/2018 |
| KR | 20190045049 A | 5/2019 |
| KR | 102050188 B1 | 11/2019 |

OTHER PUBLICATIONS

International Application No. PCT/2023/028878, International Search Report and Written Opinion mailed Nov. 14, 2023, 11 pages.

(Continued)

*Primary Examiner* — Hamza N Algibhah
(74) *Attorney, Agent, or Firm* — Finnegan, Henderson, Farabow, Garrett & Dunner, L.L.P.

(57) ABSTRACT

A microservices platform that includes a plurality of microservices for providing data processing functions for data of multiple tenants may be implemented. Each tenant of the multiple tenants may be provided with an assigned binary large object (blob) data store in a blob storage platform that is only accessible by a corresponding tenant using a corresponding tenant identifier. Furthermore, each tenant of the multiple tenants may be assigned a corresponding local database at each microservice of the plurality of microservices that is only accessible by the corresponding tenant using the corresponding tenant identifier.

20 Claims, 5 Drawing Sheets

(56) References Cited

U.S. PATENT DOCUMENTS

| | | |
|---|---|---|
| 2016/0087941 A1* | 3/2016 | Mudigonda ......... H04L 12/4641 726/12 |
| 2016/0124742 A1 | 5/2016 | Rangasamy et al. |
| 2016/0292236 A1* | 10/2016 | Joshi ..................... G06F 16/248 |
| 2018/0255009 A1 | 9/2018 | Chen et al. |
| 2019/0034460 A1* | 1/2019 | Eberlein ............... G06F 16/285 |
| 2019/0087835 A1* | 3/2019 | Schwed ............... G06F 21/6227 |
| 2019/0095498 A1 | 3/2019 | Srinivasan et al. |
| 2019/0273746 A1 | 9/2019 | Coffing |
| 2020/0036789 A1 | 1/2020 | Mehta et al. |
| 2020/0042365 A1 | 2/2020 | Tanna et al. |
| 2020/0117477 A1 | 4/2020 | Aly et al. |
| 2020/0264860 A1* | 8/2020 | Srinivasan ................ G06F 8/65 |
| 2020/0265062 A1* | 8/2020 | Srinivasan ............ G06F 9/4416 |
| 2020/0162380 A1 | 10/2020 | Pilkington et al. |
| 2020/0379829 A1* | 12/2020 | Vasilevskiy ............. G06F 16/27 |
| 2021/0218819 A1 | 7/2021 | Lawson et al. |
| 2021/0240544 A1 | 8/2021 | Ramachandran et al. |
| 2021/0258212 A1* | 8/2021 | Uke ........................ H04L 67/51 |
| 2021/0326365 A1* | 10/2021 | Moser ................... G06F 16/182 |
| 2021/0336872 A1 | 10/2021 | Singh et al. |
| 2021/0374028 A1* | 12/2021 | Kruempelmann .... G06F 11/327 |
| 2022/0014459 A1 | 1/2022 | Ganguli et al. |
| 2022/0027828 A1* | 1/2022 | Avala ................ G06Q 10/06393 |
| 2022/0121566 A1 | 4/2022 | Bernat et al. |
| 2022/0150666 A1 | 5/2022 | Kozhaya et al. |
| 2022/0164701 A1* | 5/2022 | Shrivastava ............ G06F 30/27 |
| 2022/0224637 A1 | 7/2022 | Deepak et al. |
| 2022/0342718 A1* | 10/2022 | Iqbal ..................... G06F 9/5027 |
| 2022/0417219 A1 | 12/2022 | Sheriff et al. |
| 2023/0016946 A1 | 1/2023 | Wouhaybi et al. |
| 2023/0259415 A1 | 8/2023 | Kairali et al. |
| 2023/0266972 A1 | 8/2023 | Rogers et al. |
| 2023/0289158 A1* | 9/2023 | Sipcic ........................ G06F 8/31 |
| 2024/0244114 A1* | 7/2024 | Soni ........................ H04L 63/08 |

OTHER PUBLICATIONS

International Application No. PCT/US2023/028873, International Search Report and Written Opinion mailed Nov. 15, 2023, 8 pages.
U.S. Appl. No. 17/880,991, Notice of Allowance mailed Oct. 17, 2023, 29 pages.

* cited by examiner

MAINTAINING DATA SECURITY IN A MULTI-TENANT MICROSERVICE ENVIRONMENT

BACKGROUND

The microservices architecture is a software architecture in which a software application is structured as a set of discreet services that perform separate tasks to achieve data processing objectives. The microservices may be loosely coupled and independently deployed or removed as the functionalities of the software application is updated. In some instances, the microservices that make up the software application may communicate with each other via RESTful application program interfaces (APIs), in which the data exchanged by the microservices are stateless. In other words, each of the microservices does not depend on any previously stored context to process the current data message from another microservice The microservice architecture may be used to provide a data processing environment that processes data for multiple tenants, e.g., customers. For example, the customers may be in the same market segment and have common data processing needs that can be satisfied by the same microservices platform. However, when a microservices platform is used to serve multiple customers, there is a need to make sure that data security is strictly enforced, and a customer is only able to access their own data and not the data of other customers. For example, in the context of law enforcement use, a law enforcement agency should not be able to have access to data of another law enforcement agency through the use of the microservices platform.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
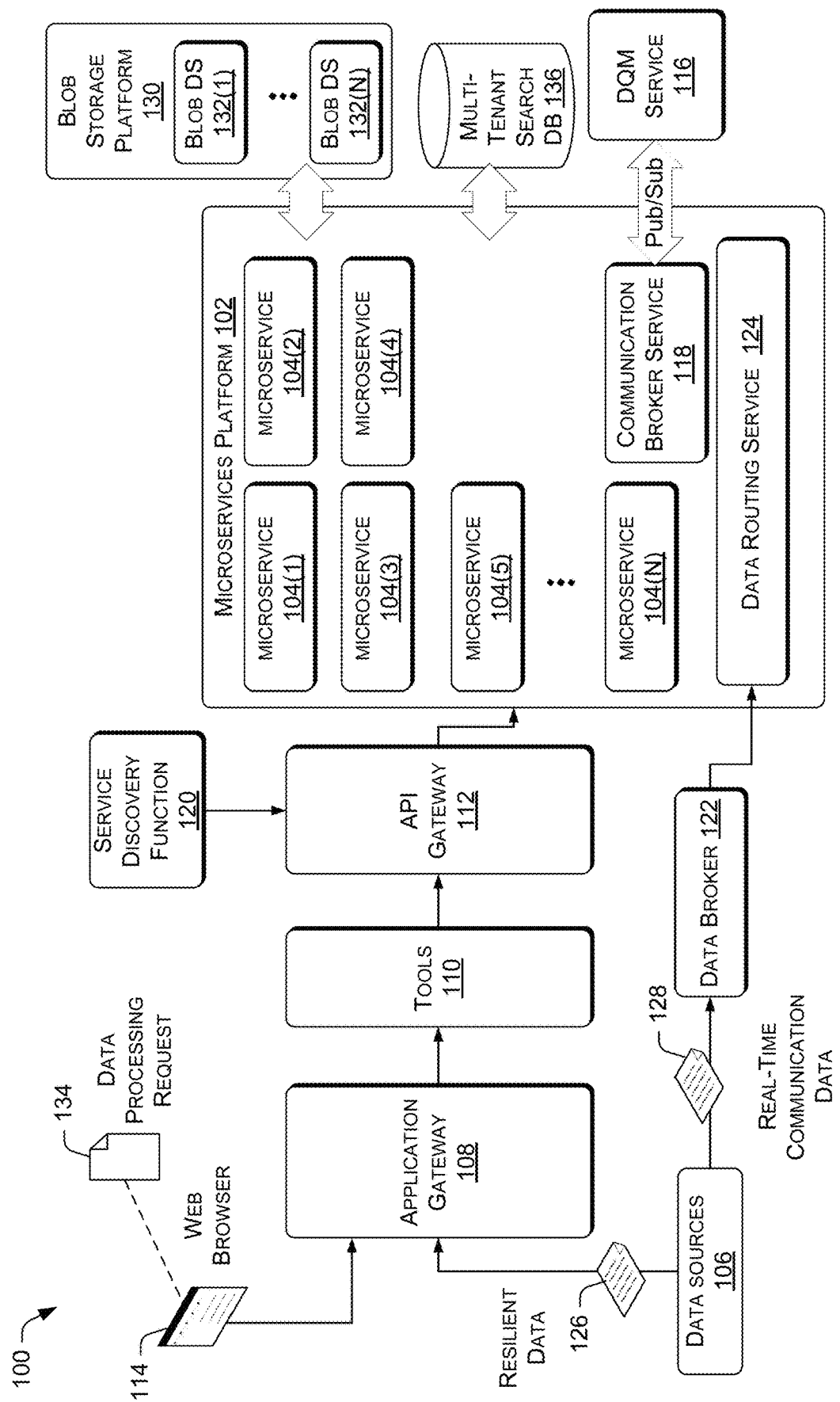
FIG. 1 illustrates an example architecture for maintaining data security in a multi-tenant microservice environment.

This disclosure is directed to techniques for maintaining data security in a multi-tenant microservice environment. The multi-tenant microservices environment may include a multi-tenant microservices platform that is developed to perform a specific set of processing tasks with respect to incoming data. The multi-tenant microservices platform may be used to provide a data processing environment that processes data for multiple tenants, e.g., customers, while maintaining data security for the data of each customer. The customers may be in the same market segment and have common data processing needs that can be satisfied by the same microservices platform. For example, the multi-tenant microservices platform may be used to simultaneously support the data processing needs of multiple customers in the form of multiple law enforcement agencies. Thus, the microservices platform may be used to simultaneously assist multiple law enforcement agencies with storage, analysis, and retrieval of electronic evidence and police activity data for the purpose of enforcing laws and preventing crime.

In various embodiments, a multi-tenant microservices platform may be implemented that includes a plurality of microservices for providing data processing functions for data of multiple tenants. The microservices platform may be configured to interact with a binary large object (blob) data storage platform that stores data for the tenants of the multi-tenant microservices platform. In such embodiments, each tenant of the multiple tenants may be provided with an assigned blob data store in the blob storage platform that is only accessible by a corresponding tenant using a corresponding tenant identifier. Each tenant of the multiple tenants is also assigned a corresponding local database at each microservice of the plurality of the microservices in the microservices platform. A local database that is assigned to a particular tenant is only accessible by the particular tenant using a corresponding tenant identifier. The local database that is assigned to the particular tenant may store metadata, e.g., database management data, that enables access to the corresponding blob data store of the tenant and/or data files stored in the corresponding blob data store of the tenant.

Thus, when a tenant desires to request a data processing operation to be performed on the data that belongs to the tenant, the tenant may use a user device to initiate a data processing request that is associated with a tenant identifier of the tenant to the microservices platform. Once the data processing request with the tenant identifier is received at a microservice of the microservices platform, the microservice may retrieve the metadata stored in a corresponding local database of the microservice that is identified by the tenant identifier. The metadata may then be used by the microservice to access a corresponding blob data store that is identified by the tenant identifier in relation to the one or more data files.

The access to the corresponding blob data store and/or the one or more data files in the corresponding blob data store may enable the microservice to perform data processing as requested in the data processing request on the one or more data files. For example, the data processing may include storing the one or more data files in the corresponding blob data store. However, when the one or more data files are already stored in the corresponding blob data store, the data processing may include providing access to, retrieving, modifying, or deleting the one or more data files. In one instance, the microservice may provide the user device with access to the one or more data files such that a user at the user device may view the data files via a web browser or some other application installed on the user device. In such an example, the microservice may provide the user device with an access token, such as an Azure shared access signature (SAS) token, that enables the user device to access (e.g., playback) the one or more data files for a limited amount of time. Furthermore, the exchange of data between the microservices of the microservices platform in a stateless manner may be accomplished using JSON web tokens (JWTs) with security descriptors to ensure that only a microservice with the correct permission may access the data provided by another microservice. In some embodiments, the JWTs used for a data processing operation on the data of a particular tenant may be embedded with the tenant identifier of the tenant to ensure that the data processing operations are carried out by the microservices only on data associated with the particular tenant.

The use of tenant identifiers to control access to the data of multiple tenants in a multi-tenant microservice environment may ensure that a particular tenant is only able to access data that belongs to the particular tenant. This enables a developer of the multi-tenant microservice environment to use a single microservices platform to service the data processing needs of multiple tenants without compromising data security. Such data security may be especially critical in a law enforcement context in which compromised data may have an impact on the ability of law enforcement agencies to effectively conduct policing activities and assist in the prosecution of criminal defendants. Example implementations are provided below with reference to the following FIGS. 1-5.

Example Architecture

FIG. 1 illustrates an example architecture for maintaining data security in a multi-tenant microservice environment. The architecture 100 may include a microservices platform 102 that is developed to perform a specific set of processing tasks with respect to incoming data. For example, in some instances, the microservices platform 102 may be a software application that is configured to assist law enforcement agencies with storage, analysis, and retrieval of electronic evidence and police activity data for the purpose of enforcing laws and preventing crime. The microservices platform 102 may include microservices 104(1)-104(N) that independently perform different processing tasks on data from one or more data sources 106 to achieve data process objectives. In some instances, data from the data sources 106 may reach the various microservices 104(1)-104(N) of the microservices platform 102 via an application gateway 108, tools 110, and/or the API gateway 112. For example, the application gateway 108 may be responsible for receiving data from one or more data collection devices of the data sources 106.

In the context of law enforcement use, example data collection devices may include multimedia cameras that record audio and/or video data that are worn by individual law enforcement officers, often referred to as body cams, body-worn sensors that track geolocations, health status (e.g., heart rate, blood pressure, etc.), other evidence gathering devices, such as digital tablets, in-vehicle or portable computers, standalone audiovisual recording equipment (portable audio/visual/multimedia recorders, surveillance UAVs or drones, concealed audio/video surveillance sensors, etc.), and/or so forth of law enforcement officers. The data collection devices may also include sensors that monitor the vehicles or other equipment used by the individual law enforcement officers. The vehicles may include cars, aircraft, boats, and/or so forth. For example, the sensors may include a gun sensor that monitors the time and date that a gun of a law enforcement officer is unholstered and/or fired. In another example, the sensors may include a multimedia camera mounted in a police vehicle, a vehicle sensor that tracks the geolocations of a police vehicle, the driving routes and associate travel/destination time and date of the vehicle, the vehicle health status of the vehicle, and/or so forth. In some embodiments, the application gateway 108 may be implemented using an Azure® Application Gateway or some other equivalent application gateway.

The tools 110 may include data management application functions that are powered by the microservices 104(1)-104(N). Thus, the tools 110 may be used to direct the microservices 104(1)-104(N) to perform specific tasks with respect to specific data collected from the data sources 106 via the API gateway 112. For example, in the context of law enforcement use, the tools 110 may include tools that enable a user to review, label, analyze, and/or redact particular data files or data packets that contain evidence, documents, or police activity data. The tools 110 may further include a tenant management tool that enables administrators to manage whether tenants of the microservices platform have permission to perform particular tasks or access particular databases. In some embodiments, the tools 110 may be provided by a web application that is accessible via a web browser 114 through the application gateway 108. In some implementations, the API gateway 112 that enables the tools 110 to invoke the microservices 104(1)-104(N) may be a .NET API gateway, such as an Ocelot API gateway. As such, data and data processing requests may be communicated to the microservices platform 102 via the Hypertext Transfer Protocol Secure (HTTPS) protocol or a comparable protocol.

In various embodiments, the microservices 104(1)-104(N) of the microservices platform 102 may use an optimized publisher-and-subscriber model to communicate with each other. In this publisher-and-subscriber model, each of the microservices 104(1)-104(N) is configured with a data distribution inbox and a data distribution outbox. The data distribution inbox of a microservice may enable the microservice to receive input message data from a data source or other microservices so that the microservice may process the received input message data. Likewise, the data distribution outbox of a microservice may enable the microservice to provide output message data to other microservices for further processing by those microservices. The underlying publisher-and-subscriber framework for enabling this model may be provided by a distributed queue management service 116. For example, the service may be provided by the Kafka® Event Hub developed by the Apache Software Foundation, the HiveMQ® MQTT broker developed by the HiveMQ GmbH of Germany, or some other comparable software service. The distributed queue management service 116 may be configured to subscribe to the data distribution outboxes of all microservices in the microservices platform. The distributed queue management service 116 may be further controlled by a communication broker service 118 that uses the publisher-and-subscriber framework to selectively route message data between various microservices according to business logic.

In operation, a microservice, such as the microservice 104(1), may process incoming data from a data source or another microservice. As a part of its data processing, the microservice may be configured to generate message data that is to be provided to other microservices for additional processing. Accordingly, the microservice may place message data in its data distribution outbox. Since the distributed queue management service 116 subscribes to the data distribution outboxes of all microservices in the microservices platform, the distributed queue management service 116 may become aware that the microservice has placed message data in its data distribution outbox. Subsequently, the distributed queue management service 116 may transfer the message data to its data store and notify the communication broker service 118 that the microservice has published the message data.

In turn, the communication broker service 118 may apply a business logic to determine one or more additional microservices (e.g., microservice 104(2) and microservice 104(4)) that are preconfigured by the business logic to receive the message data from the microservice. For example, the business logic may include a routing table that specifies that microservice 104(2) and 104(3) are configured to always receive data that is outputted by the microservice 104(1). Once the one or more recipient microservices are identified based on the business logic, the communication broker service 118 may direct the distributed queue management service 116 to distribute the message data from the microservice to the one or more corresponding data distribution inboxes of the one or more additional microservices.

For example, in the context of law enforcement use, the microservice 104(1) may be a microservice that processes new data from a data source, such as labeling and classification of the data, as well as routing of the data to a data store (e.g., a blob data store) for storage. The microservice 104(1) may be designed to further trigger the microservice 104(2) and the microservice 104(3) to perform additional functions with respect to the data. The microservice 104(2) may be a search microservice that is to be triggered to search the data store for additional data that correlates to the data. The microservice 104(3) may be a command center application that is to be triggered to use a web interface to notify a human administrator at an operation center that a new piece of data has arrived. In such a scenario, the microservice 104(1) may trigger the microservice 104(2) and the microservice 104(3) by placing the data or a link to a storage location of the data as message data in the data distribution outbox of the microservice 104(1). Subsequently, the communication broker service 118 may direct the distributed queue management service 116 to distribute the message data that is collected by the distributed queue management service 116 from the data distribution outbox of the microservice 104(1) to the data distribution inboxes of the microservice 104(2) and the microservice 104(3).

In this way, the use of the communication broker service 118 may prevent data processing bottlenecks between microservices that can occur in a traditional approach where each microservice is responsible for calling a downstream microservice. In the example above, if the microservice 104(2) is offline, the traditional approach may result in the microservice 104(1) passing data to the microservice 104(2) and then receiving a notification that the microservice 104(2) has failed. This may result in the microservice 104(1) halting its data processing operation until microservice 104(2) comes back online so as to verify that the microservice 104(2) has performed its task. However, with the use of the communication broker service 118 in conjunction with the distributed queue management service 116, the distributed queue management service 116 may store the data from the microservice 104(1) in its data store, and then provide the data to the data distribution inbox of the microservice 104(2) when the microservice 104(2) comes back online. In other words, with the implementation of the communication broker service 118 in conjunction with the distributed queue management service 116, the responsibility for ensuring data integrity for the purpose of data resiliency and atomic data operations may be transferred away from the individual microservices 104(1)-104(N) of the microservices platform 102 and to the communication broker service 118. Nevertheless, the microservices may also have the ability to output data directly to a non-microservice application, such as a web service that interfaces with a client application or a web browser.

Furthermore, the business logic (e.g., data routing paths listed in the routing table) that is used by communication broker service 118 may be modified as new microservices are added to the microservices platform 102 or removed from the microservices platform 102, or as the software architecture of the microservices platform 102 is updated. For example, there may be an existing data routing path in a routing table that routes the output data of a first microservice to a second microservice. However, when a third microservice is added to the microservices platform, another data routing path may be added to the routing table that routes the output data of the first microservice to the third microservice. Likewise, the routing table may list routing paths that route the output data of the first microservice to a second microservice and a third microservice of the microservices platform. However, when the second microservice is removed from the microservices, the routing table may be modified so that the routing path for the routing of output data from the first microservice to the second microservice may be eliminated from the routing table. In some embodiments, the tools 110 may include an application that enables a user to modify the business logic via a web interface that is accessible via a web browser, such as the web browser 114. Such ability may simplify the reconfiguration of the microservices platform 102 and/or the development of new microservices for the microservices platform 102.

The microservices platform 102 may further include a service discovery function 120. The service discovery function 120 may route incoming data that initially arrives from the data sources 106 to one or more of the microservices 104(1)-104(N) for processing based on one or more routing parameters, such as data type, device type, and/or so forth. For example, the service discovery function 120 may include logic that dictates that data of one or more first particular data types or from devices of one or more first particular device types are to be initially routed to one or more first microservices for processing, while data of one or more second particular data types or from devices of one or more second particular device types are to be initially routed to one or more second microservices for processing. Such routing may be performed by placing the incoming data or data storage location information of the incoming data in the data distribution inbox of the corresponding microservice. The incoming data may be labeled with tenant identifiers of the tenant that has the ownership of the data. For example, each data source device may be configured to generate a tenant identifier that identifies a piece of incoming data (e.g., a data packet, a data file, etc.) that is generated by the data source device. The tenant identifier may be used by a microservice to route the corresponding piece of incoming data for storage in a blob data store that is only accessible to the tenant. Furthermore, the microservice may also store database management data for the piece of incoming data in a local database of a microservice that is only accessible to the tenant.

Additionally, the service discovery function 120 may monitor the data characteristics of the data that is routed to the microservices platform 102 by the API gateway 112. For example, the data characteristics may include the data types of data (e.g., biometric sensor data, vehicle sensor data, video data, event notification data, etc.), an amount of each type of data received in a predetermined time period, the device types of the devices that supplied the data, and/or so forth. Based on such data characteristics, the service discovery function 120 may instantiate one or more instances of at least one microservice or terminate one or more additional instances of at least one microservice based on the changes in data processing demands that correlate to the data characteristics of the data that passes through the API gateway 112. Alternatively, or concurrently, the service discovery function 120 may instantiate one or more instances of at least one microservice or terminate one or more additional instances of at least one microservice based on the number and types of functionality requests that are invoked through the tools 110. In some instances, the service discovery function 120 may be implemented using the Consul® discovery service developed by HashiCorp.

As an alternative, data from the data sources 106 may reach the various microservices 104(1)-104(N) of the microservices platform 102 for processing via a data broker 122 and a data routing service 124. For example, the data broker 122 may be implemented using the HiveMQ MQTT broker, and the data routing service may be an MQTT router. In various embodiments, this alternative data distribution pathway may be used for distributing data that does not need to meet the same requirements for data integrity and resiliency as other data that is deemed to be critical enough to be distributed via the implementation of the communication broker service 118 in conjunction with the distributed queue management service 116. Instead, such data may be distributed to a microservice or a web service in the most expedient way possible for processing. For example, such distribution may avoid the delay caused by the queueing of message data by the distributed queue management service 116 during peak platform usage times. In various embodiments, the data that is distributed to one or more microservices or a web service may be real-time communication data. The real-time communication data includes data whose value is time-sensitive, meaning that the value may degrade or become worthless if not processed, used, and/or acted upon in an expedient manner. For example, in the context of law enforcement use, the real-time communication data may include the real-time geolocation of a law enforcement officer that is chasing a suspect, in which the real-time geolocation is to be rendered on a digital map accessible to a web browser by a microservice or a web service. Thus, any delay in processing or using the data may mean that the additional officers may be dispatched to an outdated geolocation, resulting in the officers being unable to timely reach a current location of the law enforcement officer to render aid or capture suspects. In another example, a real-time notification may come from a user device of a law enforcement officer indicating that a crime is in progress at a particular geolocation. Once again, there may be a need to quickly render the location of the crime event on a digital map so that additional officers can timely respond to the location to arrest suspects or render aid.

Thus, the application gateway 108 and the data broker 122 may be configured to divide up the distribution of data from the data sources 106 by data type. For example, non-real-time communication data that are required to meet higher data integrity and atomic data operation requirements, a.k.a., resilient data 126, may be provided by the application gateway 108 to the microservices 104(1)-104(N) via the publisher-to-subscriber model. In contrast, real-time communication data 128 may be distributed to one or more microservices or one or more web services via the data broker 122 and the data routing service 124. For example, the data routing service 124 may use the gRPC protocol to distribute the real-time communication data to a microservice for processing or to a web socket of a web service that is running a gRPC host for rendering on a webpage. In such embodiments, a data source device that is sending data may include an internal routing logic that directs the device to send resilient data 126 from the device to the microservices platform 102 via the application gateway 108, and the real-time communication data 128 from the device to the microservices platform 102 via the data broker 122. In alternative embodiments, the real-time communication data 128 may reach the microservices platform 102 via the API gateway 112, but then the communication broker service 118 or another routing service function of the microservice of the microservices platform 102 may determine that since the incoming data is real-time communication data instead of resilient data, the real-time communication data is to be routed to one or more microservices via the data routing service 124.

The service discovery function 120 may be further configured to determine, based on a data processing request that is invoked using a tool of the tools 110, the appropriate microservice of the microservice 104(1)-104(N) that is to be initially invoked to process data. In various embodiments, the microservices platform 102 may be used to provide a data processing environment that processes data for multiple tenants, e.g., customers, while maintaining data security for the data of each customer. For example, the microservices platform may be used to simultaneously assist multiple law enforcement agencies with storage, analysis, and retrieval of electronic evidence and police activity data for the purpose of enforcing laws and preventing crime.

In such embodiments, the microservices platform 102 may be configured to interact with a binary large object (blob) storage platform 130 that stores data for multiple tenants. In such embodiments, each tenant of the multiple tenants may be provided with an assigned blob data store in the blob storage platform 130 that is only accessible by a corresponding tenant using a corresponding tenant identifier. For example, the blob storage platform 130 may include blob data stores 132(1)-132(N), in which each of the blob data stores is assigned for exclusive use by a corresponding tenant.

Figure 2:
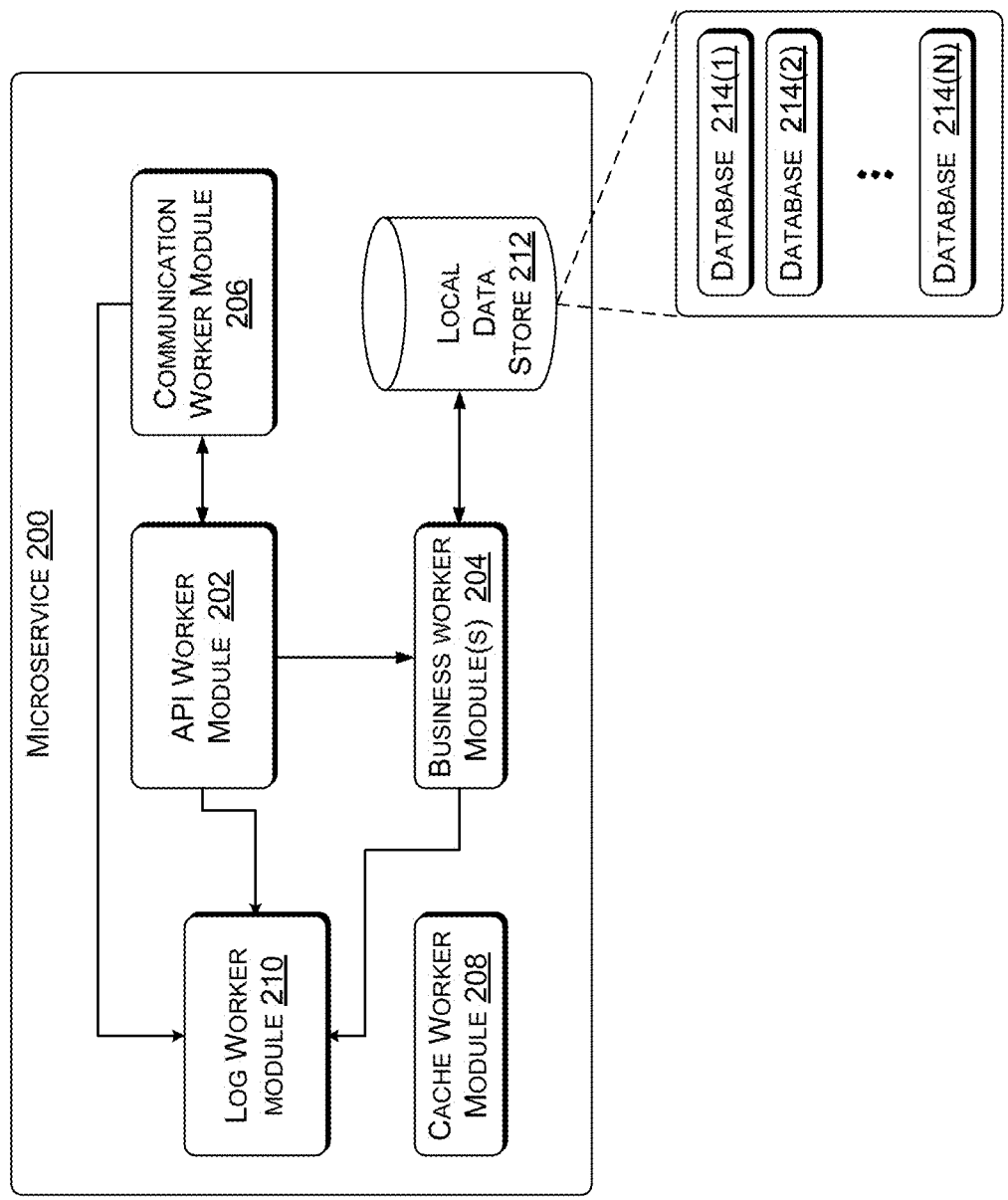
FIG. 2 is a block diagram showing example components of a microservice in the example architecture that maintains data security in a multi-tenant microservice environment.

Each tenant of the multiple tenants is also assigned a corresponding local database at each microservice of the plurality of the microservices in the microservices platform. A local database that is assigned to a particular tenant is only accessible by the particular tenant using a corresponding tenant identifier. For example, as shown in FIG. 2, a local data store 212 of an example microservice 200 may include databases 214(1)-214(N), in which each of the databases is assigned for exclusive use by a corresponding tenant. The local database that is assigned to the particular tenant may store metadata, e.g., database management data, that enables access to the corresponding blob data store of the tenant and/or data files stored in the corresponding blob data store of the tenant. For example, the database management data may include a link to a specific blob data store, links to blob data files in the specific blob data store, index keys of the blob data files in the specific data blob data store, and/or other metadata for accessing at least one of the specific blob data store or the blob data files in the specific blob data store. Each of the multiple tenants may be assigned a corresponding blob data store at a blob storage platform (e.g., blob storage platform 130) and/or a local database at a local data store of a microservice via a tenant management tool. For example, the tenant management tool may be one of the tools 110 that is accessible via a web browser, such as the web browser 114.

Thus, when an authorized user of a tenant desires to request a data processing operation to be performed by the microservices platform 102 on data associated with the tenant, the authorized user of the tenant may use a web browser on a user device to interact with one of the tools 110 and initiate a data processing request 134. The data processing request 134 may include a user identifier of the authorized user that uniquely identifies the authorized user. For example, the user identifier may be "customer1.getac.cloud.com". The user identifier may have been used by the authorized user, along with an authorization credential (e.g., a password, a biometric input, etc.) to authenticate to a user authentication function of the microservices platform 102 and gain access to the platform.

Upon receiving the data processing request 134 with the user identifier, the API gateway 112 may retrieve a tenant identifier (e.g., "ABC01234") of a tenant that corresponds to the user identifier. The tenant identifier may have been previously assigned to the tenant via the tenant management tool. For example, the API gateway 112 may use a translation table that lists one or more unique tenant identifiers of individual tenants that are serviced by the microservices platform 102, as well as one or more unique user identifiers that identify authorized users associated with each tenant. Once a corresponding tenant identifier has been retrieved, the API gateway 112 may associate the data processing request 134 with the tenant identifier. For example, the API gateway 112 may supplement the data processing request 134 with an additional data field that holds the corresponding tenant identifier. Alternatively, or concurrently, the data processing request 134 may include a database connection string, and the API gateway 112 may insert the corresponding tenant identifier into the database connection string.

Additionally, the service discovery function 120 may determine a particular microservice of the microservices 104(1)-104(N) that is to receive the data processing request 134 based on one or more request parameters of the data processing request 134. For example, if the data processing request 134 is to search stored data for a particular data file, the data process processing request may be routed to a microservice that handles data search queries. In another example, if the data processing request 134 is for redacting a particular piece of information from a data file, the data processing request 134 may be routed to a microservice that handles data redaction. In an additional example, if the data processing request 134 is for retrieving a video data file from a blob data store for playback, the data processing request 134 may be routed to a microservice that handles video streaming. In yet another example, if the data processing request 134 is for storing a piece of data into a data store associated with the tenant, the data processing request 134 may be routed to a microservice that handles file management operations. Accordingly, the one or more request parameters may include a data processing operation type identifier that matches a type of operation performed by a microservice, a data file identifier, a tool identifier of the tool used to initiate the request, and/or so forth. Thus, the service discovery function 120 may send the data processing request 134 with the tenant identifier to the particular microservice such that the microservice executes the data processing request 134 on data that is associated with the tenant identifier.

Once the data processing request 134 with the tenant identifier is received at a microservice (e.g., microservice 104(1)) of the microservices platform, the microservice may retrieve the metadata stored in a corresponding local database of the microservice that is identified by the tenant identifier. The metadata may then be used by the microservice to access a corresponding blob data store (e.g., blob data store 132(1)) that is identified by the tenant identifier in relation to the one or more data files.

The access to the corresponding blob data store and/or the one or more data files in the corresponding blob data store may enable the microservice to perform data processing as requested in the data processing request on the one or more data files. For example, the data processing may include storing the one or more data files in the corresponding blob data store. However, when the one or more data files are already stored in the corresponding blob data store, the data processing may include providing the user device with access to, retrieving, modifying, or deleting the one or more data files. For example, the microservice may provide the user device with access to the one or more data files (e.g., one or more video files) such that a user at the user device may view the data files via a web browser or some other application installed on the user device.

In such an example, the blob storage platform 130 may be part of a content delivery network (CDN). Accordingly, the microservice may provide the user device that initiated the data processing request with an access token, such as an Azure shared access signature (SAS) token, that enables the user device to access the one or more video files for a limited amount of time from the blob storage platform 130. In some instances, the use of the Azure SAS token may be combined with the use of Azure private endpoints. With the use of the Azure private endpoints, the user device may be provided with secure access to the video files over a private virtual network link while the SAS token is kept private, e.g., without sending the SAS token directly to a web browser. This is because an issued SAS token is generally not revokable and sending a SAS token to a web browser may expose the token to the possibility of interception and misuse.

In other embodiments, the blob storage platform 130 may include localized blob data stores that are deployed at the premises of tenants, while the microservices platform 102 and the remaining software architecture are cloud-based. For example, a localized blob data store may be an Amazon S3 bucket that is installed locally at a premise of a tenant. Such use of localized blob data stores may reduce network bandwidth usage and improve network latency without comprising data security.

Furthermore, the exchange of data between the microservices 104(1)-104(N) of the microservices platform 102 in a stateless manner may be accomplished using JSON web tokens (JWTs). The JWTs may be provided with security descriptors to ensure that only a microservice with the correct permission may access the data provided by another microservice. In some embodiments, the JWTs used for a data processing operation on the data of a particular tenant may be embedded with the tenant identifier of the tenant to ensure that the data processing operations are carried out by the microservices only on data associated with the particular tenant.

Along with the blob storage platform 130, a multi-tenant search database 136 may be deployed for use with the microservices platform 102. For example, the multi-tenant search database 136 may be a single database that supports a multi-tenant capable full-text search engine, such as an Elasticsearch engine. This is in contrast to the data storage scheme used internally within the microservices and with the blob storage platform 130. The data that is stored in the multi-tenant search database 136 may belong to multiple tenants and are indexed using tenant identifiers of the multiple tenants. For the purpose of accessing data in the multi-tenant search database 136 to perform a search, a data processing request in the form of a search request may be initiated by a user at a user device, in which the data search request includes a user identifier of the user. Following the retrieval of a tenant identifier that corresponds to the user identifier, the API gateway 112 may embed the tenant identifier in a database connection string of the search request and forward the search request to a microservice that interfaces with the multi-tenant search database 136. The microservice may then use the tenant identifier associated with the search request to search for data that are associated with the tenant identifier and fulfills the search request.

Example Components of a Microservice

FIG. 2 is a block diagram showing example components of a microservice that uses the optimized interservice communication for microservices. The example microservice 200 may represent any of the microservices 104(1)-104(N) that are present in the microservices platform 102. The example microservice 200 may include an API worker module 202, one or more business worker modules 204, a communication worker module 206, a cache worker module 208, a log worker module 210, and a local data store 212. Each of these modules may include routines, program instructions, objects, and/or data structures that are executable by a processor to perform particular tasks or implement particular abstract data types. The API worker module 202 may be configured to orchestrate the various data processing tasks that are performed by the microservice 200 for incoming data. For instance, when the API worker module 202 determines that the microservice 200 has received incoming data for which a data processing method is to be performed, the API worker module 202 may allocate one or more of the business worker modules 204 to each perform a particular data processing operation of the data processing method on the incoming data. The API worker module 202 may allocate multiple business worker modules to perform their operations concurrently and/or consecutively. Each of the business worker modules 204 may perform its operation to produce output data, which may be further processed by another business worker module and/or stored in a storage location, e.g., a data table, in a data store.

In various embodiments, the business worker modules 204 may store such output data or processed data in a centralized data storage, such as an on-premises or cloud-based blob storage, and store data management data for the data that are stored in the blob storage (e.g., links to blob data files, index keys of the blob data files, and other metadata for the blob data files) in the local data store 212. For example, the data management data for the data of each tenant may be stored in a corresponding database within the local data store 212, such as the databases 214(1)-214(N). The data management data stored in the local data store 212 may enable the microservice 200 to access and retrieve stored data from the centralized cloud storage by various tenants while maintaining data security for the individual tenants. For example, the API worker module 202 of the microservice 200 may invoke another microservice that is configured to interface with the centralized data storage with the corresponding metadata in order to store and/or retrieve data files from the centralized data storage. In various embodiments, each of the databases 214(1)-214(N) may be a Structured Query Language (SQL) database.

The communication worker module 206 may be called upon by the API worker module 202 to interface with the publisher-to-subscriber framework. For example, the communication worker module 206 may retrieve input data from the data distribution inbox of the microservice 200 and provide the input data to the one or more business worker modules 204 for processing by the one or more business worker modules 204. The communication worker module 206 may also place output data generated by the microservice 200 in a data distribution outbox of the microservice 200. In some instances, the communication worker module 206 may be configured to also receive input data directly from the data routing service 124. The cache worker module 208 may be used by the API worker module 202 and/or the business worker modules 204 to store output data or processed data generated by one or more worker modules in a data cache for faster access during data processing.

Finally, the log worker module 210 may track the operations that are performed by the other modules of the microservice 200 and store information regarding the operations in an internal log. For example, the information related to an operation may include an identifier of the operation, a description of the operation, a time and date of the operation, a success and/or failure indication for the operation, and/or so forth.

Example Server and Computing Device Components

Figure 3:
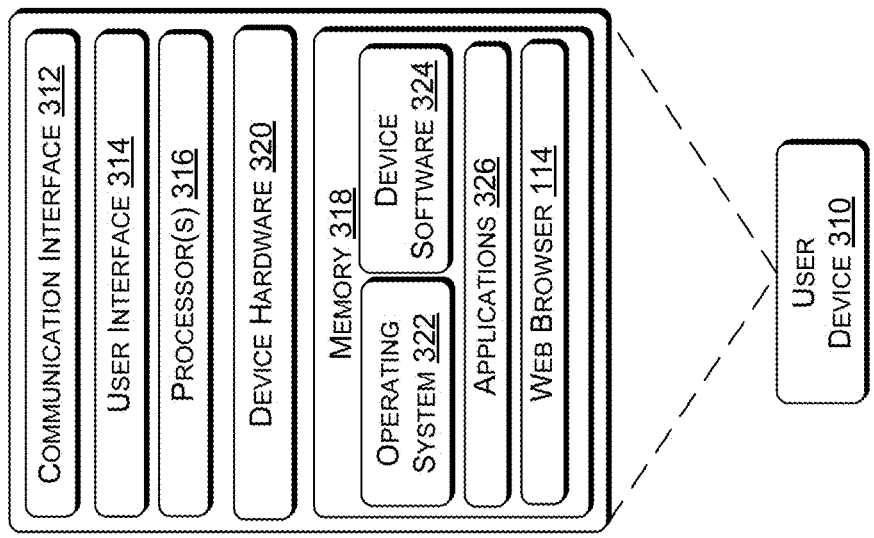
FIG. 3 is a block diagram showing various components of one or more servers and a computing device that support the implementation of the example architecture for maintaining data security in a multi-tenant microservice environment.
Figure 3:
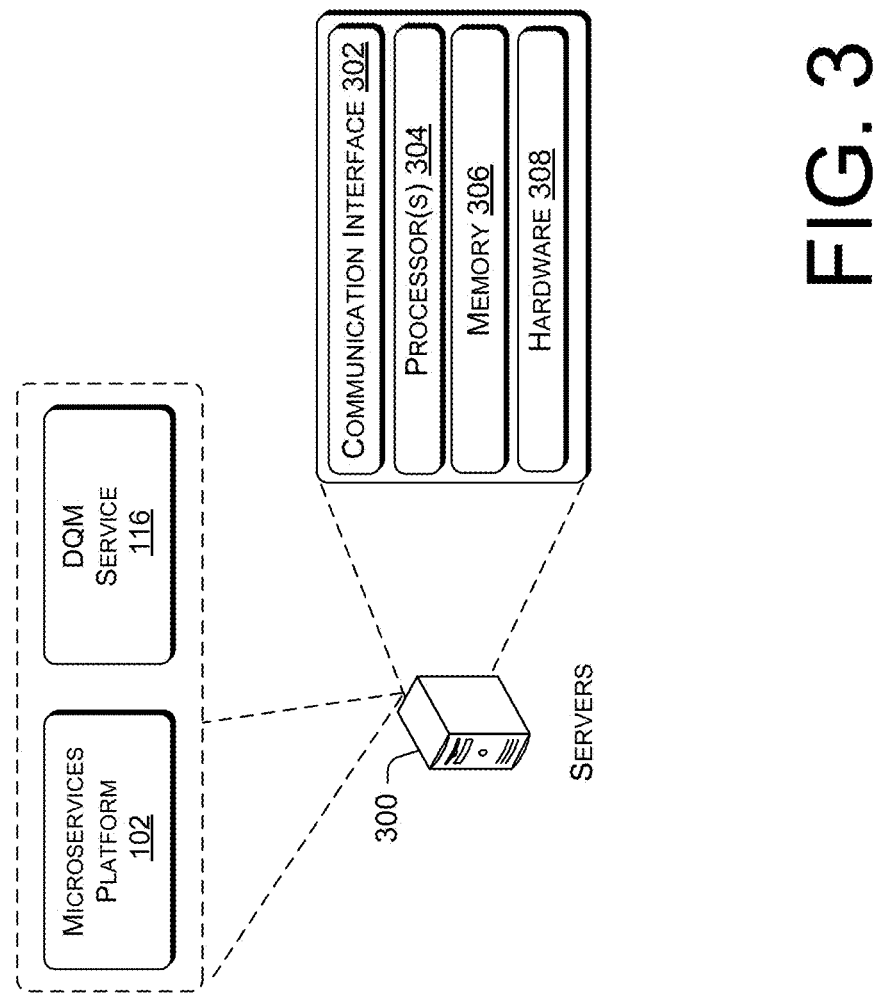

FIG. 3 is a block diagram showing various components of one or more servers and a computing device that support the implementation of optimized interservice communication for microservices. The one or more servers 300 may be implemented using one or more computing nodes. The computing nodes may include a communication interface 302, one or more processors 304, memory 306, and hardware 308. The communication interface 302 may include wireless and/or wired communication components that enable the servers 300 to transmit data to and receive data from other networked devices. The hardware 308 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multi-media/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. In other embodiments, the servers 300 or components thereof may be implemented using virtual computing devices in the form of virtual machines or software containers that are hosted in a computing cloud. The computing cloud may include a variety of disaggregated servers that provide virtual application server functionalities and virtual storage functionalities.

For example, the computing cloud may include multiple physical computer servers that are disaggregated via a hypervisor. The physical computer servers each may have one or more processors, memory, at least I/O interface, and/or network interface. The features and variations of the processors, memory, the I/O interface, and the network interface are substantially similar to those described for the servers 300. The computing cloud may include a hypervisor that can delegate calls to any portion of hardware in the underlying physical servers, and upon request generate a virtual machine from the separate portions of hardware. A virtual machine may host not only software applications, components including services, but also virtual web server functionalities and virtual storage/database functionalities.

The virtual machines themselves may be further partitioned into containers, which enable the execution of a program in an independent subset of the virtual machine. Software such as Kubernetes, Mesos, and Docker are examples of container management software. Unlike virtual machines which have a delay in startup due to the need for provisioning an entire OS, containers may be generated more quickly and on-demand since the underlying virtual machine is already provisioned. The computing cloud may embody an abstraction of services. Common examples include service abstractions such as Platform as a Service ("PAAS"), Infrastructure as a Service ("IAAS"), and Software as a Service ("SAAS"). Accordingly, the servers 300 and/or their computing cloud equivalent may provide an execution environment for the execution of the microservices platform 102 and the distributed queue management service 116. Each of the distributed queue management service 116 and the communication broker service 118 may include routines, program instructions, objects, and/or data structures that are executable by a processor to perform particular tasks or implement particular abstract data types. The execution environment may be further used for the execution and/or implementation of other components (e.g., gateways, tools, brokers, functions, data stores, etc.) illustrated in FIG. 1.

As further shown in FIG. 3, a user device 310 may be representative of any user device that may be used to interface with the microservices platform 102. The user device 310 may include a communication interface 312, a user interface 314, one or more processors 316, memory 318, and device hardware 320. The communication interface 312 may include wireless and/or wired communication components that enable the electronic device to transmit or receive voice or data communication via the wireless carrier network, as well as other telecommunication and/or data communication networks.

The user interface 314 may enable a user to provide inputs and receive outputs from the 310. The user interface 314 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 318 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 320 may include a modem that enables the user device 310 to perform telecommunication and data communication with a network. The device hardware 320 may further include signal converters, antennas, hardware decoders and encoders, graphics processors, a universal integrated circuit card (UICC) or an embedded UICC (eUICC), and/or the like that enable the user device 310 to execute applications and provide telecommunication and data communication functions.

The one or more processors 316 and the memory 318 of the user device 310 may implement an operating system 322, device software 324, one or more applications 326, and the web browser 114. Such software may include routines, program instructions, objects, and/or data structures that are executed by the processors 316 to perform particular tasks or implement particular abstract data types.

The operating system 322 may include components that enable the user device 310 to receive and transmit data via various interfaces (e.g., user controls, communication interface 312, and/or memory input/output devices). The operating system 322 may also process data using the one or more processors 316 to generate outputs based on inputs that are received via the user interface 314. For example, the operating system 322 may provide an execution environment for the execution of the applications 326 and the web browser 114. The operating system 322 may include a presentation component that presents the output (e.g., display the data on an electronic display, store the data in memory, transmit the data to another electronic device, etc.).

The operating system 322 may include an interface layer that enables applications to interface with the modem and/or the communication interface 312. The interface layer may comprise public APIs, private APIs, or a combination of both public APIs and private APIs. Additionally, the operating system 322 may include other components that perform various other functions generally associated with an operating system. The device software 324 may include software components that enable the user device to perform functions. For example, the device software 324 may include basic input/output system (BIOS), bootrom, or a bootloader that boots up the user device 310 and executes the operating system 322 following power-up of the device.

The applications 326 may include applications that provide utility, entertainment, and/or productivity functionalities to a user of the user device 310. The web browser 114 may enable a user to access web pages for interacting with various functionalities offered by the microservices platform 102.

Example Processes

Figure 4:
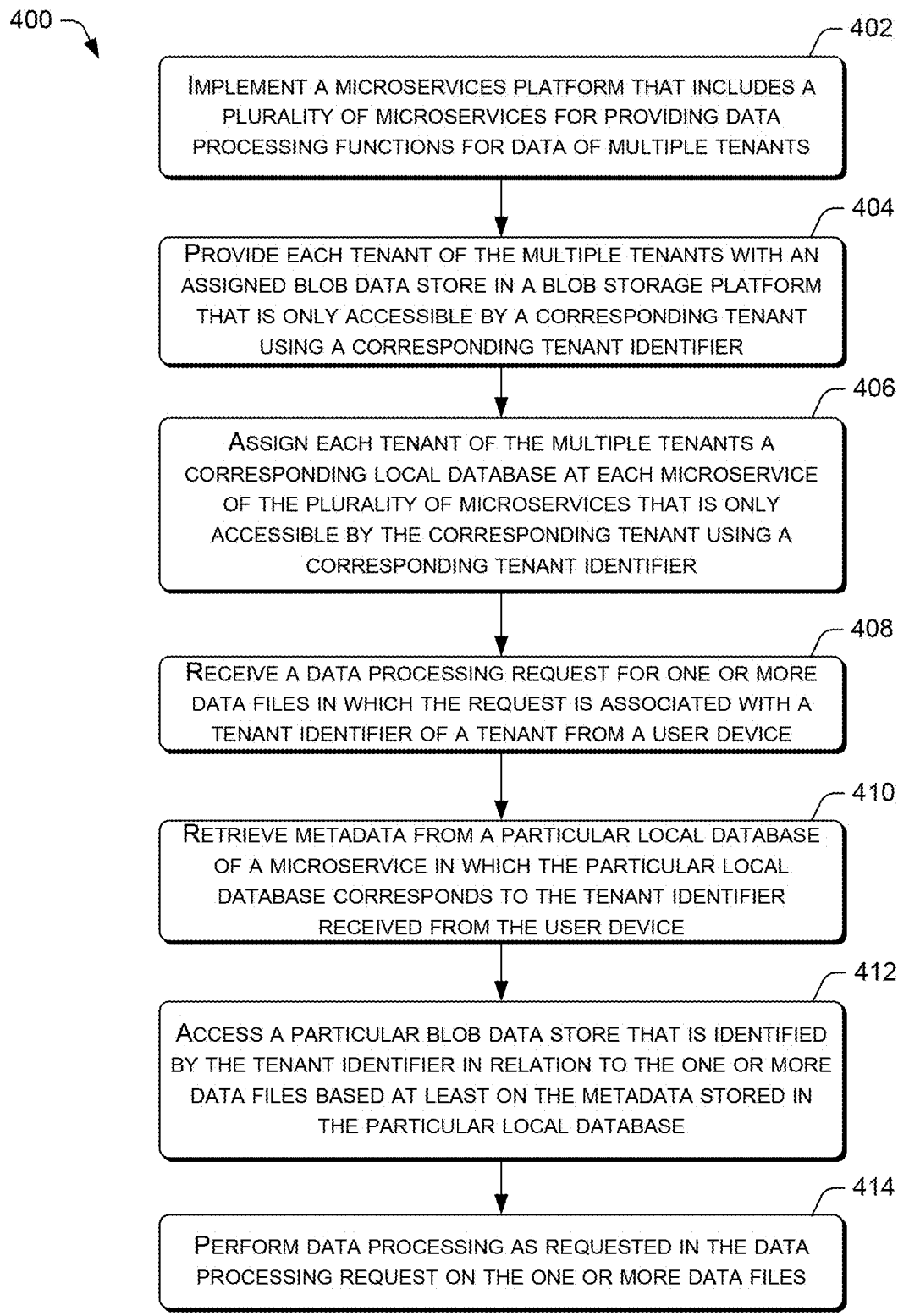
FIG. 4 illustrates a flow diagram of an example process for using a tenant identifier of a tenant to perform data processing while maintaining data security in a multi-tenant microservice environment.
Figure 5:
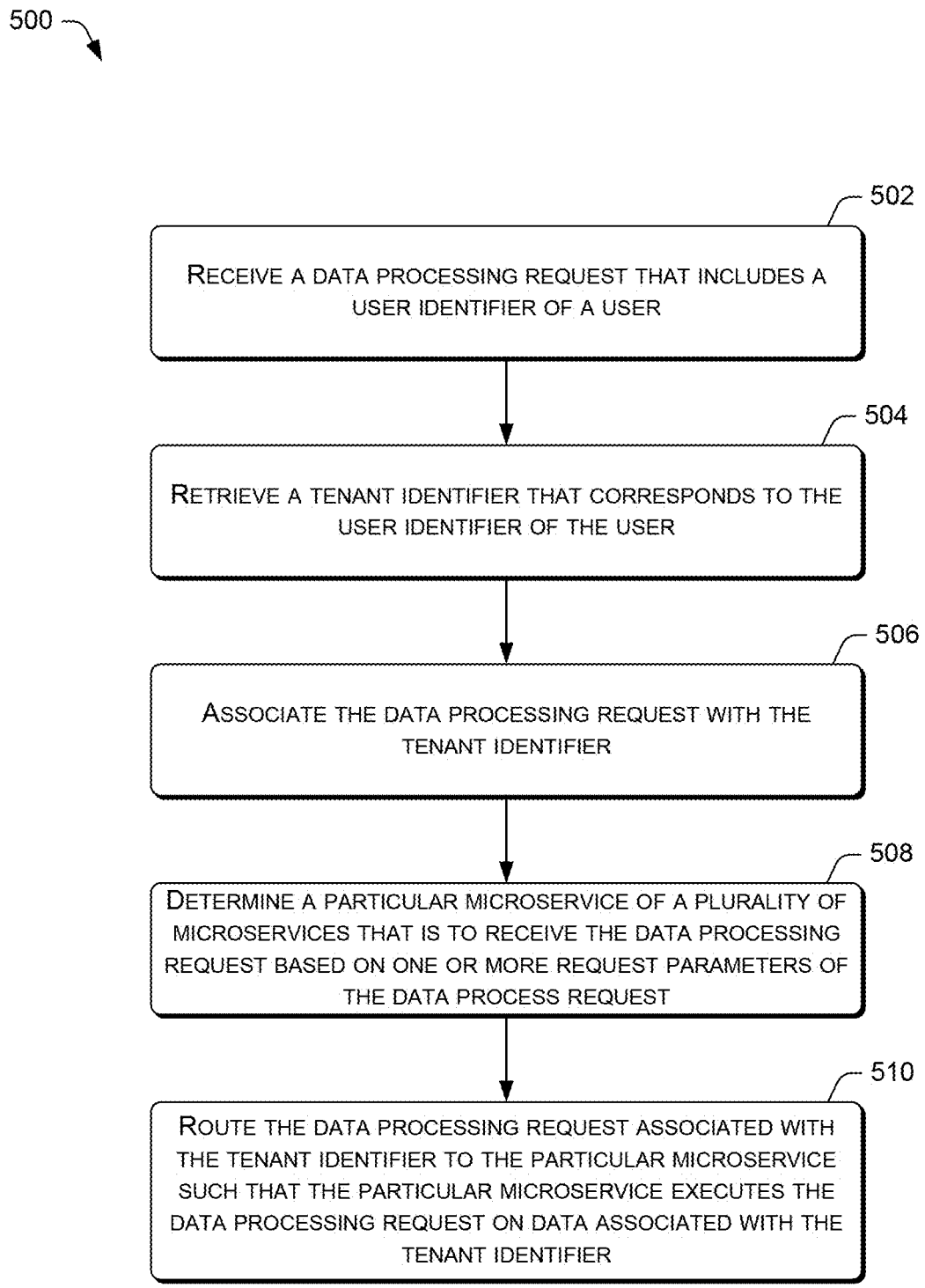
FIG. 5 illustrates a flow diagram of an example process for using a tenant identifier of a tenant to maintain data security in a multi-tenant microservice environment during the access of data by the tenant.

FIGS. 4 and 5 present illustrative processes 400 and 500 for maintaining data security in a multi-tenant microservice environment. Each of the processes 400 and 500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like that perform particular functions or implement particular abstract data types. The order in which the operations are described for each process is not intended to be construed as a limitation, and any number of the described blocks can be combined in any order and/or in parallel to implement the process. For discussion purposes, the processes 400 and 500 are described with reference to the architecture 100 of FIG. 1.

FIG. 4 illustrates a flow diagram of an example process 400 for using a tenant identifier of a tenant to perform data processing while maintaining data security in a multi-tenant microservice environment. At block 402, a microservices platform may be implemented that includes a plurality of microservices for providing data processing functions for data of multiple tenants. At block 404, each tenant of the multiple tenants may be provided with an assigned blob data store in a bob storage platform that is only accessible by the corresponding tenant using the corresponding tenant identifier. In various embodiments, the configuration and assignment may be performed using a tenant management tool that is accessible via a web browser.

At block 406, each tenant of the multiple tenants may be assigned a corresponding local database at each microservice of the plurality of microservices that is only accessible by a corresponding tenant using a corresponding tenant identifier. In various embodiments, the configuration and assignment may be performed using a tenant management tool that is accessible via a web browser.

At block 408, a data processing request for one or more data files may be received from a user device in which the request is associated with a tenant identifier of a tenant. The one or more data files may be labeled with the same tenant identifier as including data that belongs to the tenant. In various embodiments, the data processing request may be initiated by a user that interacts with one of the tools 110. At block 410, metadata may be retrieved from a particular local database of a microservice in which the particular local database corresponds to the tenant identifier received from the user device. In various embodiments, the metadata may include database management data that enables access to the corresponding blob data store of the tenant and/or data files stored in the corresponding blob data store of the tenant.

At block 412, a particular blob data store that is identified by the tenant identifier may be accessed in relation to the one or more data files based at least on the metadata stored in the particular local database. At block 414, data processing as requested in the data processing request may be performed on the one or more data files. For example, the data processing may include storing the one or more data files in the corresponding blob data store. However, when the one or more data files are already stored in the corresponding blob data store, the data processing may include providing access to, retrieving, modifying, or deleting the one or more data files.

FIG. 5 illustrates a flow diagram of an example process 500 for using a tenant identifier of a tenant to maintain data security in a multi-tenant microservice environment during the access of data by the tenant. The example process 500 may further illustrate block 408 of the process 400. At block 502, an API gateway 112 that interfaces with a microservices platform 102 may receive a data processing request that includes a user identifier of a user. In various embodiments, the data processing request may be initiated by the user via interactions with one of the tools 110.

At block 504, the API gateway 112 may retrieve a tenant identifier that corresponds to the user identifier of the user. For example, the API gateway 112 may use a translation table that lists one or more unique tenant identifiers of individual tenants that are serviced by the microservices platform 102, as well as one or more unique user identifiers that identify authorized users associated with each tenant.

At block 506, the API gateway 112 may associate the data processing request with the tenant identifier. For example, the API gateway 112 may supplement the data processing request with an additional data field that holds the corresponding tenant identifier. Alternatively, or concurrently, the data processing request may include a database connection string, and the API gateway 112 may insert the corresponding tenant identifier into the database connection string.

At block 508, the API gateway 112 may use a service discovery function 120 to determine a particular microservice of a plurality of microservices that is to receive the data processing request based on one or more request parameters of the data processing request. For example, the one or more request parameters may include a data processing operation type identifier that matches a type of operation performed by a microservice, a data file identifier, a tool identifier of the tool used to initiate the request, and/or so forth.

At block 510, the API gateway 112 may route the data processing request with the tenant identifier to the particular microservice such that the particular microservice executes the data processing request on the data associated with the tenant identifier.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
   implementing a microservices platform that includes a plurality of microservices for providing data processing functions for data of multiple tenants;
   providing each tenant of the multiple tenants with an assigned binary large object (blob) data store in a blob storage platform that is only accessible by a corresponding tenant using a corresponding tenant identifier;
   assigning each tenant of the multiple tenants a corresponding local database at each microservice of the plurality of microservices that is only accessible by the corresponding tenant using the corresponding tenant identifier; and
   using metadata stored in the corresponding local database to access the assigned blob data store.

2. The one or more non-transitory computer-readable media of claim 1, wherein the acts further comprise:
   receiving, from a user device, a data processing request for one or more data files in which the data processing request is associated with a tenant identifier of a tenant;

retrieving particular metadata from a particular local database of a microservice in which the particular local database corresponds to tenant identifier received from the user device;

accessing a particular blob data store that is identified by the tenant identifier in relation to the one or more data files based at least on the particular metadata stored in the particular local database; and performing data processing as requested in the data processing request on the one or more data files.

3. The one or more non-transitory computer-readable media of claim 2, wherein the one or more data files are identified by the tenant identifier as belonging to the tenant, and wherein the performing includes storing the one or more data files in the particular blob data store, providing the user device with access to the one or more data files as stored in the particular blob data store, retrieving the one or more data files from the particular blob data store, modifying the one or more data files in the particular blob data store, or deleting the one or more data files from the particular blob data store.

4. The one or more non-transitory computer-readable media of claim 3, wherein the one or more data files include a video file, providing includes providing an Azure shared access signature (SAS) token that enables the user device to playback the video file for a limited amount of time.

5. The one or more non-transitory computer-readable media of claim 4, wherein the providing further includes providing the user device with access to the video file via the Azure SAS token and Azure private endpoints.

6. The one or more non-transitory computer-readable media of claim 2, wherein the particular metadata includes database management data that enables at least one of access to the particular blob data store of the tenant or the one or more data files as stored in the particular blob data store.

7. The one or more non-transitory computer-readable media of claim 2, wherein the particular blob data store is a cloud-based blob data store or a localized blob data store that is installed locally on a premise of the tenant.

8. The one or more non-transitory computer-readable media of claim 2, wherein the receiving the data processing request includes:

receiving a data processing request that includes a user identifier of a user from a user device;

retrieving a tenant identifier that corresponds to the user identifier of the user;

associating the data processing request with the tenant identifier;

determining a particular microservice of the plurality of microservices that is to receive the data processing request based on one or more request parameters; and routing the data processing request associated with the tenant identifier to the particular microservice such that the particular microservice executes the data processing request on data associated with the tenant identifier.

9. The one or more non-transitory computer-readable media of claim 8, wherein the associating includes at least one of supplementing the data processing request with an additional data field that holds the tenant identifier or inserting the tenant identifier into a database connection string of the data processing request.

10. The one or more non-transitory computer-readable media of claim 8, wherein the one or more request parameters include a data processing operation type identifier that matches a type of operation performed by the particular microservice.

11. The one or more non-transitory computer-readable media of claim 1, wherein the acts further comprise:

receiving a search request for searching a multi-tenant search database for data related to a tenant, in which the data of the multiple tenants stored in the multi-tenant search database are indexed using the tenant identifiers of the multiple tenants; and embedding a tenant identifier of the tenant in a database connection string of the search request to access the data related to the tenant.

12. The one or more non-transitory computer-readable media of claim 1, wherein the multiple tenants include a plurality of law enforcement agencies.

13. A system, comprising:

one or more processors; and memory including a plurality of computer-executable components that are executable by the one or more processors to perform a plurality of actions, the plurality of actions comprising:

implementing a microservices platform that includes a plurality of microservices for providing data processing functions for data of multiple tenants;

providing each tenant of the multiple tenants with an assigned binary large object (blob) data store in a blob storage platform that is only accessible by a corresponding tenant using a corresponding tenant identifier;

assigning each tenant of the multiple tenants a corresponding local database at each microservice of the plurality of microservices that is only accessible by the corresponding tenant using the corresponding tenant identifier; and using metadata stored in the corresponding local database to access the assigned blob data store.

14. The system of claim 13, wherein the plurality of actions further comprise:

receiving, from a user device, a data processing request for one or more data files in which the data processing request is associated with a tenant identifier of a tenant;

retrieving particular metadata from a particular local database of a microservice in which the particular local database corresponds to tenant identifier received from the user device;

accessing a particular blob data store that is identified by the tenant identifier in relation to the one or more data files based at least on the particular metadata stored in the particular local database; and performing data processing as requested in the data processing request on the one or more data files.

15. The system of claim 14, wherein the one or more data files are identified by the tenant identifier as belonging to the tenant, and wherein the performing includes storing the one or more data files in the particular blob data store, providing the user device with access to the one or more data files as stored in the particular blob data store, retrieving the one or more data files from the particular blob data store, modifying the one or more data files in the particular blob data store, or deleting the one or more data files from the particular blob data store.

16. The system of claim 14, wherein the receiving the data processing request includes:

receiving a data processing request that includes a user identifier of a user from a user device;

retrieving a tenant identifier that corresponds to the user identifier of the user;

associating the data processing request with the tenant identifier;

determining a particular microservice of the plurality of microservices that is to receive the data processing request based on one or more request parameters; and routing the data processing request associated with the tenant identifier to the particular microservice such that the particular microservice executes the data processing request on data associated with the tenant identifier.

17. The system of claim 16, wherein the associating includes at least one of supplementing the data processing request with an additional data field that holds the tenant identifier or inserting the tenant identifier into a database connection string of the data processing request.

18. The system of claim 16, wherein the one or more request parameters include a data processing operation type identifier that matches a type of operation performed by the particular microservice.

19. A computer-implemented method, comprising:

implementing a microservices platform that includes a plurality of microservices for providing data processing functions for data of multiple tenants;

providing each tenant of the multiple tenants with an assigned binary large object (blob) data store in a blob storage platform that is only accessible by a corresponding tenant using a corresponding tenant identifier;

assigning each tenant of the multiple tenants a corresponding local database at each microservice of the plurality of microservices that is only accessible by the corresponding tenant using the corresponding tenant identifier;

receiving, from a user device, a data processing request for one or more data files in which the data processing request is associated with a tenant identifier of a tenant;

retrieving metadata from a particular local database of a microservice in which the particular local database corresponds to tenant identifier received from the user device;

accessing a particular blob data store that is identified by the tenant identifier in relation to the one or more data files based at least on the metadata stored in the particular local database; and performing data processing as requested in the data processing request on the one or more data files.

20. The computer-implemented method of claim 19, wherein the receiving the data processing request includes:

receiving a data processing request that includes a user identifier of a user from a user device;

retrieving a tenant identifier that corresponds to the user identifier of the user;

associating the data processing request with the tenant identifier;

determining a particular microservice of the plurality of microservices that is to receive the data processing request based on one or more request parameters; and routing the data processing request associated with the tenant identifier to the particular microservice such that the particular microservice executes the data processing request on data associated with the tenant identifier.

* * * * *